(12) United States Patent
Chen et al.

(10) Patent No.: US 11,165,295 B2
(45) Date of Patent: Nov. 2, 2021

(54) ROTOR LAMINATION ASSEMBLY FOR A MOTOR

(71) Applicant: Nanjing Chervon Industry Co., Ltd., Nanjing (CN)

(72) Inventors: Shibo Chen, Nanjing (CN); Qian Xu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 16/809,233

(22) Filed: Mar. 4, 2020

(65) Prior Publication Data

US 2020/0204019 A1 Jun. 25, 2020

Related U.S. Application Data

(63) Continuation of application No. 15/686,601, filed on Aug. 25, 2017, now abandoned.

(30) Foreign Application Priority Data

Sep. 13, 2016 (CN) .......................... 201610820874.0

(51) Int. Cl.
*H02K 1/27* (2006.01)

(52) U.S. Cl.
CPC ........... *H02K 1/276* (2013.01); *H02K 1/2766* (2013.01); *H02K 2201/03* (2013.01); *H02K 2213/03* (2013.01)

(58) Field of Classification Search
CPC .. H02K 1/276; H02K 1/2766; H02K 2213/03; H02K 2201/03
(Continued)

(56) References Cited

U.S. PATENT DOCUMENTS

| | | |
|---|---|---|
| 8,536,748 B2 | 9/2013 | Liang |
| 9,997,969 B2 | 6/2018 | Tsuzuki |

(Continued)

FOREIGN PATENT DOCUMENTS

EP 2980962 A2 2/2016

OTHER PUBLICATIONS

Received STIC search report from searcher Steve Chung for claim 1 on Mar. 22, 2021. (Year: 2021).*

(Continued)

*Primary Examiner* — Shawki S Ismail
*Assistant Examiner* — Htet Z Kyaw
(74) *Attorney, Agent, or Firm* — Greenberg Traurig, LLP

(57) ABSTRACT

A rotor lamination assembly is formed with a central hole wherein a central axis goes through the central hole. The rotor lamination assembly is further formed with an even number of mounting holes arranged between a rim of the central hole and an outer rim of the rotor lamination assembly. The outer rim of the rotor lamination assembly has a projection on a plane substantially perpendicular to the central axis. The projection includes an even number of base curve edges, an even number of protruding curve edges, and connecting curve edges. Each protruding curve edge is arranged between two adjacent base curve edges in a circumferential direction of the central axis. The protruding curve edges and the base curve edges are connected with each other through the connecting curve edges. Every two mounting holes which are arranged symmetrically constitute a mounting hole group. A supporting portion is disposed between the two mounting holes and corresponded with the base curve edge in the circumferential direction of the central axis. Edges of the two mounting holes of the mounting hole group which are farthest from each other are respectively corresponded with the two adjacent protruding curve edges in the circumferential direction of the central axis.

6 Claims, 6 Drawing Sheets

(58) Field of Classification Search
USPC .................................................. 310/156.53
See application file for complete search history.

(56) References Cited

U.S. PATENT DOCUMENTS

| | | | |
|---|---|---|---|
| 10,205,359 B2 | 2/2019 | Chowdhury | |
| 10,211,689 B2 | 2/2019 | Liang | |
| 2005/0200223 A1 | 9/2005 | Tajima et al. | |
| 2006/0091759 A1* | 5/2006 | Migita | H02K 15/024 |
| | | | 310/215 |
| 2008/0048517 A1* | 2/2008 | Ochiai | H02K 1/278 |
| | | | 310/216.004 |
| 2010/0194228 A1 | 8/2010 | Lee et al. | |
| 2012/0267975 A1 | 10/2012 | Nishimura | |
| 2016/0301268 A1 | 10/2016 | Watanabe | |
| 2017/0085143 A1 | 3/2017 | Tanaka | |
| 2017/0104376 A1 | 4/2017 | Nakagawa | |

OTHER PUBLICATIONS

Received STIC search report from searcher Steve Chung for claim 9 on Mar. 23, 2021. (Year: 2021).*
Received STIC search report from EIC 2800 searcher Steve Chung for claim 9 on Aug. 25, 2021. (Year: 2021).*
Received STIC search report from EIC 2800 searcher Francisco Cueto for claim 1 on Aug. 24, 2021. (Year: 2021).*

* cited by examiner

ROTOR LAMINATION ASSEMBLY FOR A MOTOR

CROSS REFERENCE TO RELATED APPLICATION

This application is a continuation of U.S. patent application Ser. No. 15/686,601 entitled "Rotor Lamination Assembly," filed Aug. 25, 2017, which claims the benefit under 35 U.S.C. § 119(a) of Chinese Patent Application No. CN2016108208740, filed on Sep. 13, 2016, each of which are incorporated herein by reference in its entirety.

FIELD OF THE DISCLOSURE

The present disclosure relates generally to motors and, more particularly, to a rotor lamination assembly of a motor.

BACKGROUND OF THE DISCLOSURE

A brushless motor is generally constituted by a motor itself and a corresponding driving circuit, which adopts electronic commutation instead of traditional brush commutation. The brushless motor has advantages of high efficiency, long use life, ease of control, etc. The brushless motor is widely used in portable electronic devices, power tools, etc.

The brushless motor used for power tools needs to satisfy the requirements of compact structure and high power. However, when the currently known motors have a higher no-load speed, they generate large vibration noise which affects the user experience. The higher no-load speed increases the force acting on the rotor lamination assembly. Thus, it is needed to design a new rotor lamination assembly with sufficient structural strength.

The statements in this section merely provide background information related to the present disclosure and may not constitute prior art.

SUMMARY

In one aspect of the disclosure, a rotor lamination assembly is provided. The rotor lamination assembly of a motor is formed with a central hole, a central axis goes through the central hole. The rotor lamination assembly is further formed with an even number of mounting holes arranged between a rim of the central hole and an outer rim of the rotor lamination assembly. The outer rim of the rotor lamination assembly has a projection on a plane substantially perpendicular to the central axis. The projection includes an even number of base curve edges, an even number of protruding curve edges and connecting curve edges. Each protruding curve edge is arranged between two adjacent base curve edges in a circumferential direction of the central axis. The protruding curve edges and the base curve edges are connected with each other through the connecting curve edges. Every two mounting holes which are arranged symmetrically constitute a mounting hole group. A supporting portion is disposed between the two mounting holes and corresponded with the base curve edge in the circumferential direction of the central axis. Edges of the two mounting holes of the mounting hole group which are farthest from each other are respectively corresponded with the two adjacent protruding curve edges in the circumferential direction of the central axis.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected examples and not all possible implementations, and are not intended to limit the scope of the present disclosure. Corresponding reference numerals indicate corresponding parts throughout the several views of the drawings.

DETAILED DESCRIPTION

The following description of the preferred embodiments is merely example in nature and is in no way intended to limit the invention hereinafter claimed, its application, or uses.

Figure 1:
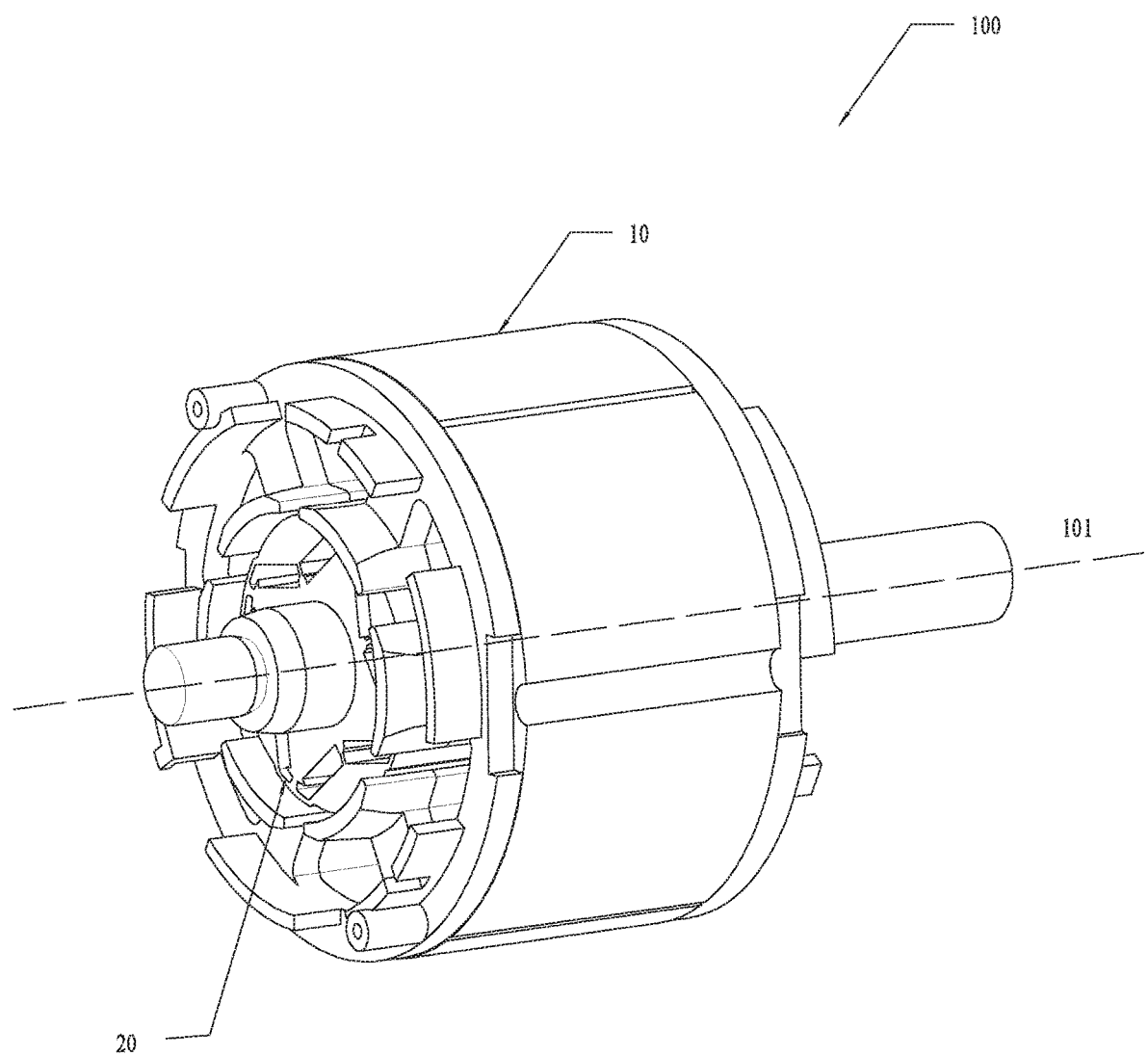
FIG. 1 is a schematic view of an example motor.
Figure 2:
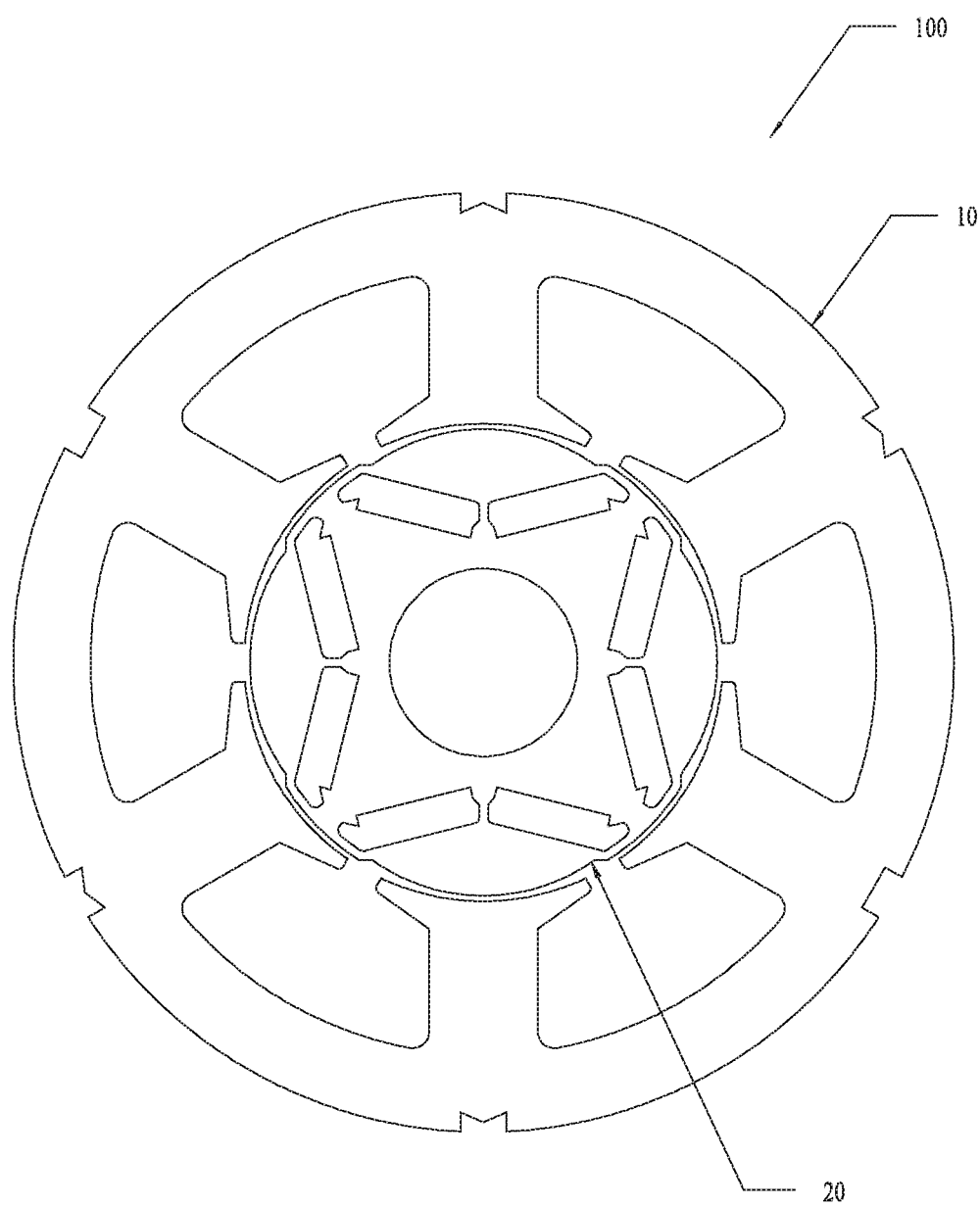
FIG. 2 is a schematic view of a stator and a rotor of the motor in FIG. 1.

Referring to FIGS. 1-2, a motor 100 includes a stator 10 and a rotor 20. The rotor 20 can be driven to rotate about a central axis 101 by a magnetic field generated by the stator 10. The rotor 20 is sleeved by the stator 10, and there is an interval between the stator 10 and the rotor 20 in a radial direction of the central axis 101.

Figure 3:
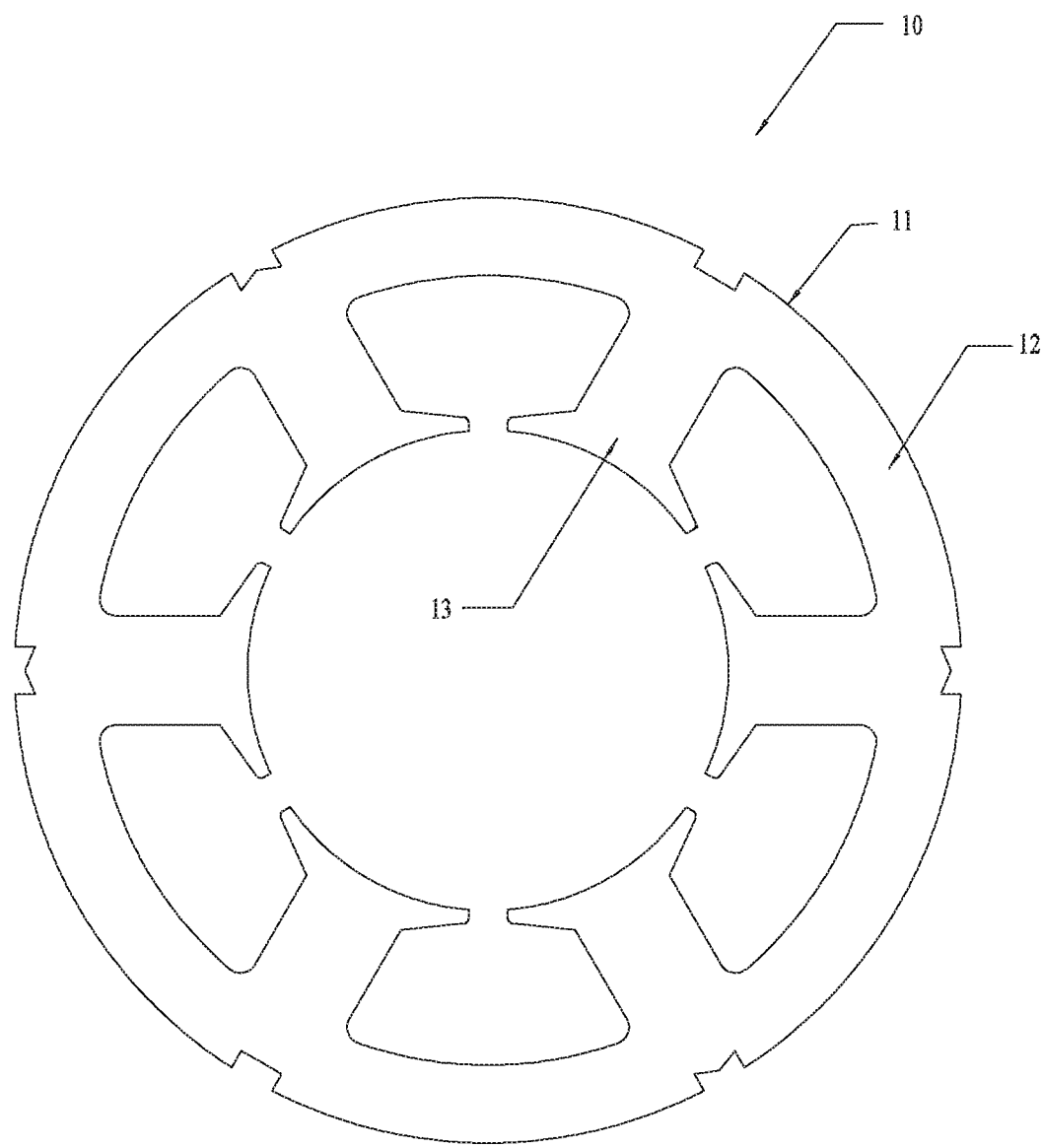
FIG. 3 is a schematic view of the stator of the motor in FIG. 1.

As shown in FIG. 3, the stator 10 includes a stator core 11 and windings. The stator core 11 includes a yoke ring 12 located on the periphery thereof and a plurality of teeth portions 13 protruding inwardly. The teeth portions 13 are arranged at intervals along a circumferential direction of the central axis 101, and a slot for accommodating the windings 14 is formed between the adjacent two teeth portions 13. The windings 14 can thus be twined on the teeth portions 13. The yoke ring 12 has a projection in a plane perpendicular to the central axis 101. The projection includes a cylindrical surface located on the outermost thereof, and the cylindrical surface takes a projection point O of the central axis 101 (shown in FIG. 4) as the center of a circle. The cylindrical surface has a radius which is defined as a stator outer radius. Specifically, the stator outer radius has a range of 60-80 mm.

Figure 4:
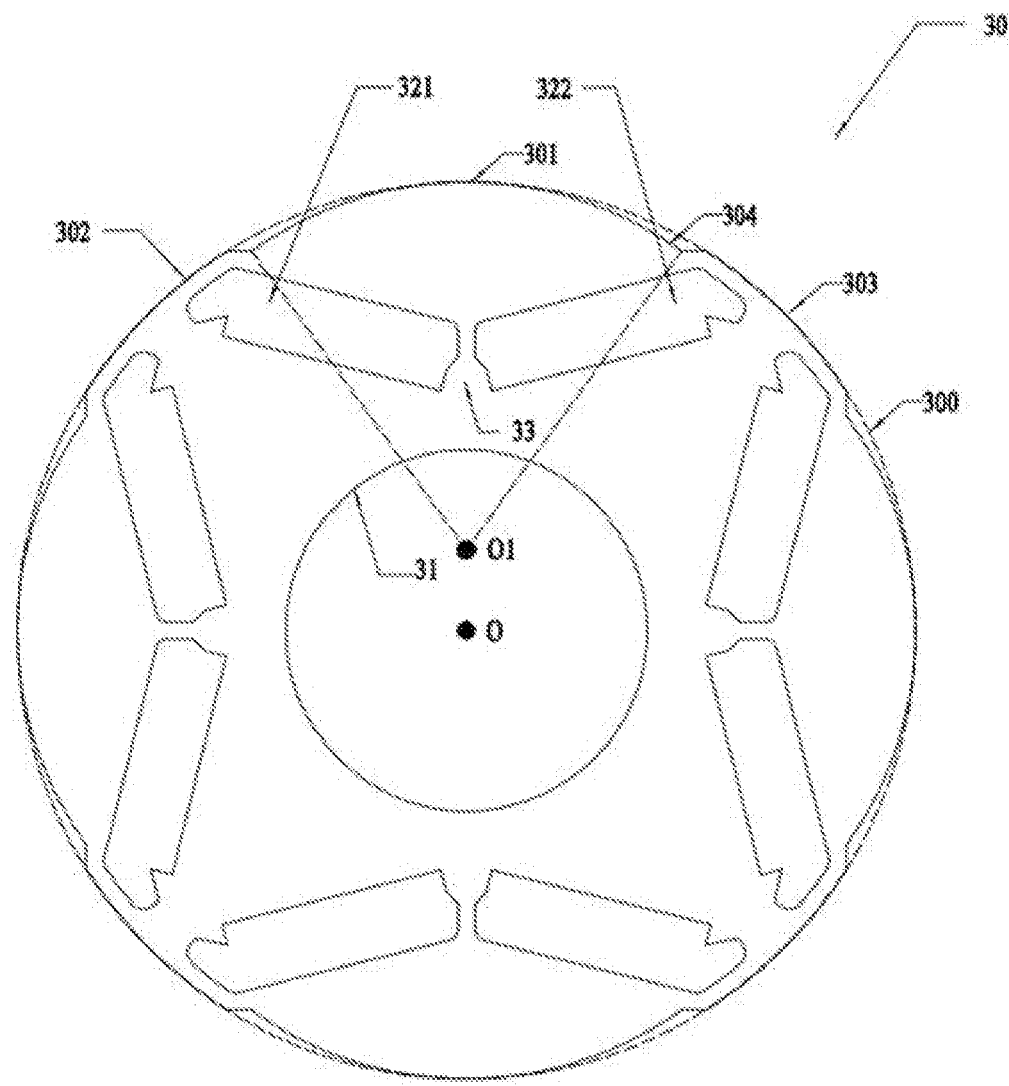
FIG. 4 is a schematic view of a rotor lamination assembly of the motor in FIG. 2.

As shown in FIG. 4, the rotor 20 is formed by stacking a plurality of rotor laminations along the central axis 101. The plurality of rotor laminations constitutes a rotor lamination assembly 30. The rotor lamination assembly 30 has a central hole 31, and the central axis 101 goes through a center of the central hole 31. The rotor lamination assembly 30 is formed with an even number of mounting holes. The mounting holes are arranged between a rim of the central hole 31 and an outer rim of the rotor lamination assembly 30. The outer rim of the rotor lamination assembly 30 has a projection in the plane perpendicular to the central axis 101. The projection includes an even number of base curve edges 301 and an even number of protruding curve edges 302. Each protruding curve edge 302 is arranged between two adjacent base curve edges 301 in the circumferential direction of the central axis 101. The adjacent two base curve edges 301 and the protruding curve edge 302 are connected with each other through connecting curve edges 304.

The base curve edges 301 and the protruding curve edges 302 may be curves, arcs or circular arcs. Specifically, the protruding curve edges 302 are protruded out of the base curve edges 301. Here, the protruding curve edges 302 are protruded out of the base curve edges 301 relatively, not absolutely. The connecting curve edges 304 are curves protruding towards the central hole 31.

Specifically, when the base curve edges 301 are circular arcs, the base curve edges 301 have a center deviated from the projection point O of the central axis 101. The protruding curve edges 302 have a center coincided with the projection point O of the central axis 101. The central hole 31 has a circular arc concentric with the protruding curve edges 302. That is, the central hole 31 and the protruding curve edges 302 are concentric, and the centers of them are coincided with the projection point O of the central axis 101.

In a specific embodiment, the rotor lamination assembly 30 is formed with eight mounting holes. The projection of the outer rim of the rotor lamination assembly 30 includes four base curve edges 301 and four protruding curve edges 302. Thus, a non-uniform gap is formed between the outer rim of the rotor lamination assembly 30 and a circle formed by the inner side of the teeth projections 13 of the stator 10, which can reduce torque pulsation and noise of the motor, so that the stability of the motor is improved.

Figure 5:
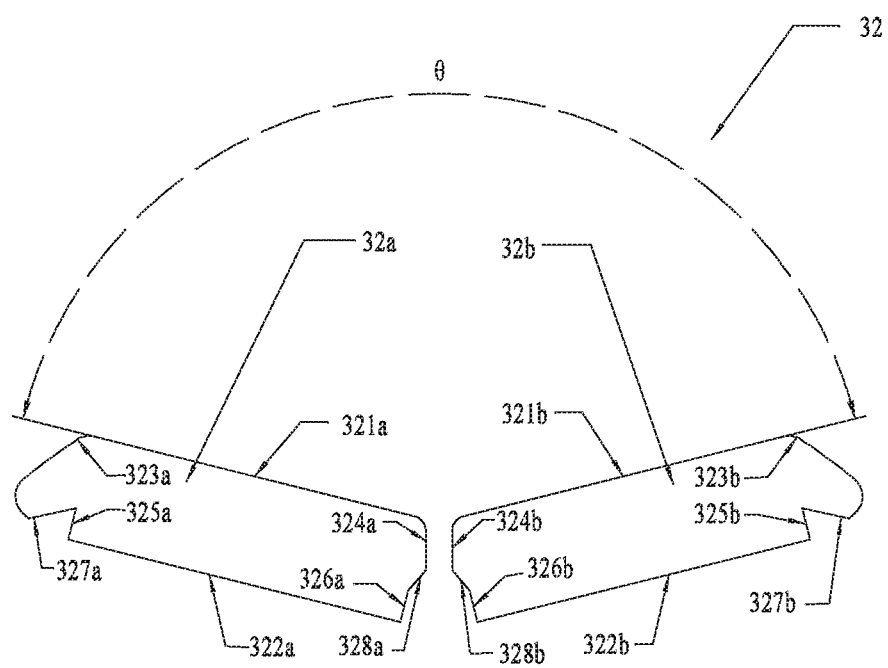
FIG. 5 is a schematic view of a mounting hole assembly of the rotor lamination assembly in FIG. 4.

Referring to FIGS. 4-5, every two mounting holes 32a, 32b which are arranged symmetrically constitute a mounting hole group 32. A supporting portion 33 is disposed between the two mounting holes 32a, 32b and corresponded with the base curve edge 301 in the circumferential direction of the central axis 101. Specifically, the two mounting holes 32a, 32b of each mounting hole group 32 are arranged symmetrically relative to a radial axis going through the projection point O of the central axis 101. That is, the radial axis is a connecting line of the projection point O and a middle point of the base curve edge 301 corresponding with supporting portion 33. The edges of the two mounting holes 32a, 32b of each mounting hole group 32 which are farthest from each other are arranged on the circumferential direction of the central axis 101 and corresponded with the two adjacent protruding curve edges 302.

As shown in FIG. 5, a rim of the mounting hole 32a has a projection on the plane perpendicular to the central axis 101, and the projection includes an outside straight edge 321a and an inside straight edge 322a which are substantially parallel to each other. The outside straight edge 321a is arranged close to the rotor lamination assembly 30 and the inside straight edge 322a is arranged close to the central hole 31. Correspondingly, the rim of the other mounting hole 32b has a projection on the plane perpendicular to the central axis 101, and the projection includes an outside straight edge 321b and an inside straight edge 322b. The extension lines of the two outside straight edges 321a, 321b of the two mounting holes 32a, 32b are intersected, and an angle θ between the two extension lines of the two outside straight edges 321a, 321b is 145°-180°. Specifically, the angle θ is 145°-160° and 160°-180°.

The projection of the rim of the mounting hole 32a on the plane perpendicular to the central axis 101 further includes an outer magnetic isolated edge 323a and an inner magnetic isolated edge 324a. The outer magnetic isolated edge 323a is arranged on a side of the mounting hole 32a which is close to the protruding curve edge 302, and the inner magnetic isolated edge 324a is arranged on the other side of the mounting hole 32a which is close to the central hole 31. The outer magnetic isolated edge 323a is inclined along a direction close to the protruding curve edge 302 and intersected with the outside straight edge 321a, and the inner magnetic isolated edge 324a is inclined along a direction far from the protruding curve edge 302 and intersected with the outside straight edge 321a. Because the mounting hole 32b is symmetrical with the mounting hole 32a, the projection of the rim of the mounting hole 32b includes anouter magnetic isolated edge 323b arranged on a side thereof which is close to the protruding curve edge 303 and an inner magnetic isolated edge 324b arranged on the other side thereof which is close to the central hole 31. The outer magnetic isolated edge 323b is inclined along a direction close to the protruding curve edge 303 and intersected with the outside straight edge 321b, and the inner magnetic isolated edge 324b is inclined along a direction far from the protruding curve edge 303 and intersected with the outside straight edge 321b.

The mounting hole 32a is used to place a permanent magnet. Specifically, the permanent magnet is a cuboid. The outside straight edge 321a and the inside straight edge 322a of the mounting hole 32a are fitted with two long sides of the permanent magnet respectively, so that the permanent magnet can be embedded into the mounting hole 32a and fixed in its width direction. The outer magnetic isolated edge 323a, an outer connecting edge 327a and an outside broad side of the permanent magnet form an external leakage magnetic groove so that the flux can flow smoothly. The inner magnetic isolated edge 324a, an inner connecting edge 328a, and an inside broadside of the permanent magnet form an internal leakage magnetic groove so that the flux can flow smoothly.

The projection of the rim of the mounting hole 32a further includes an outer locating edge 325a and an inner locating edge 326a. The outer locating edge 325a is arranged close to the protruding curve edge 302 and substantially perpendicular to the inside straight edge 322a. The inner locating edge 326a is arranged close to the central hole and substantially perpendicular to the inside straight edge 322a. The permanent magnet is fixed in its length direction by means of the outer locating edge 325a and the inner locating edge 326a. The outer locating edge 325a and the outer magnetic isolated edge 323a are connected with each other through the outer connecting edge 327a. The inner locating edge 326a and the inner magnetic isolated edge 324a are connected with each other through the inner connecting edge 328a. Correspondingly, the projection of the rim of the mounting hole 32b further includes an outer locating edge 325b and an inner locating edge 326b. The outer locating edge 325b is arranged close to the protruding curve edge 303 and substantially perpendicular to the inside straight edge 322b. The inner locating edge 326b is arranged close to the central hole 31 and substantially perpendicular to the inside straight edge 322b. The outer locating edge 325b and the outer magnetic isolated edge 323a are connected with each other through an outer connecting edge 327b. The inner locating edge 326b and the inner magnetic isolated edge 324b are connected with each other through an inner connecting edge 328b.

The two inner magnetic isolated edges 324a, 324b of the mounting holes 32a, 32b are close to the central hole 31 along the radius direction of the central axis 101. The supporting portion 33 is close to the central hole 31 and located between the two inner magnetic isolated edges 324a, 324b. Thus, the rotor lamination assembly 30 has higher strength and can be avoided from being damaged.

Figure 6:
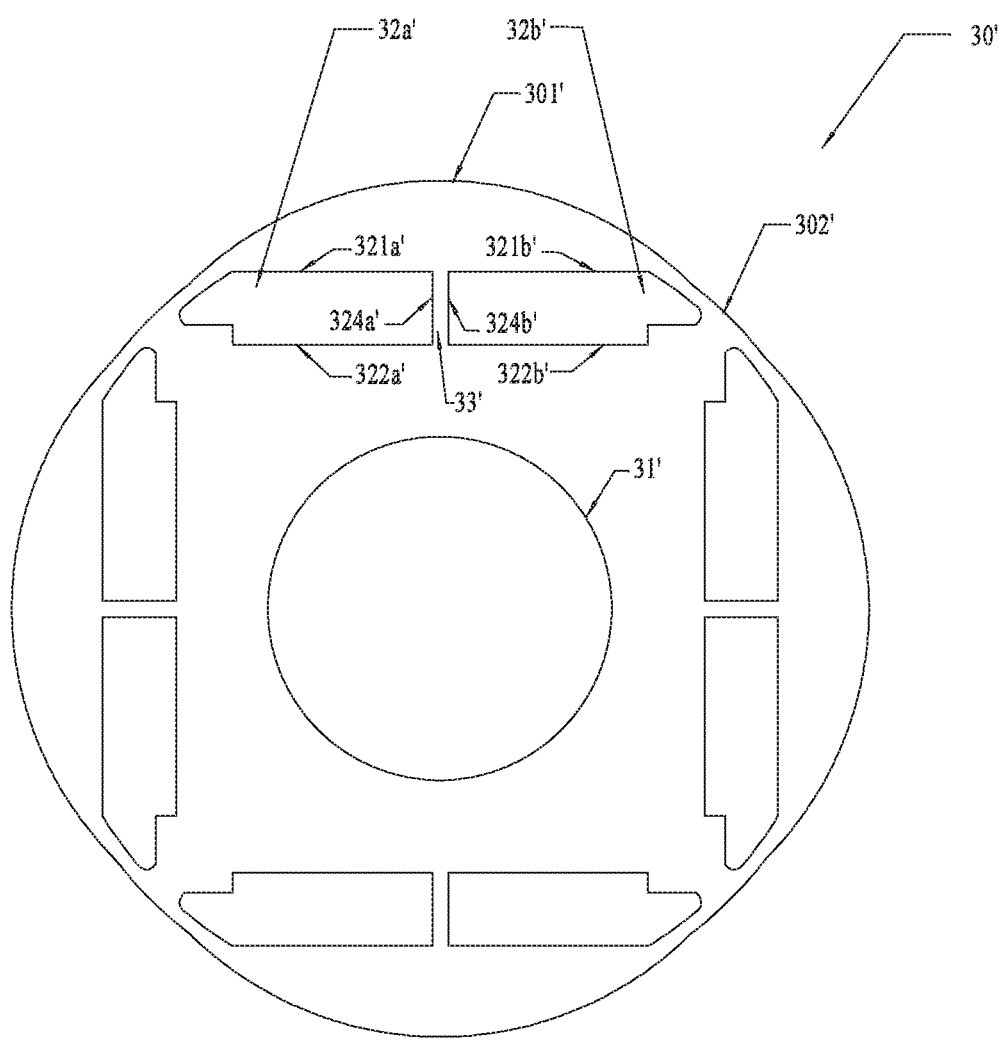
FIG. 6 is a section view of a further example of a rotor lamination assembly.

As shown in FIG. 6, in a second example, a rotor lamination assembly 30' is formed with a central hole 31', and a central axis goes through the central hole 31'. The rotor lamination assembly 30' is further formed with an even number of mounting holes which are arranged between a rim of the central hole 31' and an outer rim of the rotor lamination assembly 30'. The outer rim of the rotor lamination assembly 30' has a projection on a plane perpendicular to the central axis. The projection includes an even number of base curve edges 301' and an even number of protruding curve edges 302'. Each protruding curve edge 302' is arranged between the two adjacent base curve edges 301' in a circumferential direction of the central axis. The protruding curve edges 302' are protruded out of the base curve edges 301'in a radial direction of the central axis.

Every two mounting holes 32a', 32b'which are arranged symmetrically constitute a mounting hole group 32'. A supporting portion 33' is disposed between the two mounting holes 32a', 32b' and corresponded with the base curve edge 301' in the circumferential direction of the central axis.

The rotor lamination assembly 30' in the second example is different from that in the preferred embodiment as shown in FIG. 2, in that an angle between two extension lines of two outside straight edges 321a', 321b' of the mounting hole group 32' is 180°. An inner magnetic isolated edge 324a' is substantially perpendicular to the outer straighter edge 321a' and an inside straight edge 322a' respectively. An inner magnetic isolated edge 324b' is substantially perpendicular to the outer straighter edge 321b' and the inside straight edge 322a' respectively.

The rotor lamination assembly in the embodiments described above is adapted to the motor, especially the motor of a power tool. The power tool may be a marble machine, a high pressure circular saw, an electric drill, etc.

The above illustrates and describes basic principles, main features and advantages of the present invention. Those skilled in the art should appreciate that the above embodiments do not limit the claimed invention in any form. Technical solutions obtained by equivalent substitution or equivalent variations all fall within the scope of the claimed invention.

We claim:

1. A rotor lamination assembly of a motor, which is formed with a central hole and having a central axis that goes through the central hole, the rotor lamination assembly formed with an even number of mounting holes arranged between a rim of the central hole and an outer rim of the rotor lamination assembly, the outer rim of the rotor lamination assembly comprising:
    a projection on a plane substantially perpendicular to the central axis, the projection comprises:
        an even number of base curve edges;
        an even number of protruding curve edges; and
        connecting curve edges;
    wherein each protruding curve edge is arranged between two adjacent base curve edges in a circumferential direction of the central axis, the protruding curve edges and the base curve edges are connected with each other through the connecting curve edges, every two mounting holes which are arranged symmetrically constitute a mounting hole group, a supporting portion is disposed between the two mounting holes and corresponded with the base curve edge in the circumferential direction of the central axis, and edges of the two mounting holes of the mounting hole group which are farthest from each other are respectively corresponded with the two adjacent protruding curve edges in the circumferential direction of the central axis,
    wherein the base curve edges comprise circular arcs and the circular arcs have a center which is deviated from a projection point of the central axis,
    wherein the rim of the mounting hole on the plane substantially perpendicular to the central axis comprises an outside straight edge and an inside straight edge and wherein the outside straight edge and the inside straight edge are substantially parallel with each other, the outside straight edge is located on a side of the mounting hole which is close to the outer edge of the rotor lamination, and the inside straight edge is located on the other side of the mounting hole which is close to the central hole,
    wherein the projection of the outer rim of the mounting hole further comprises an inner magnetic isolated edge located on a side of the mounting hole which is close to the supporting portion and an outer magnetic isolated edge located on the other side of the mounting hole which is close to the protruding curve edge and wherein the inner magnetic isolated edge and the outer magnetic isolated edge are intersected with the outside straight edge,
    wherein the projection of the rim of the mounting hole further comprises an inner locating edge arranged on a side of the mounting hole which is close to the supporting portion and an outer locating edge arranged on the other side of the mounting hole which is close to the protruding curve edge and wherein the inner locating edge and the outer locating edge are substantially perpendicular to the inside straight edge; and
    wherein the inner locating edge is closer to the projection point of the central axis than the inner magnetic isolated edge.

2. The rotor lamination assembly of claim 1, wherein the two inner magnetic isolated edges of the mounting hole group are close to the central hole.

3. The rotor lamination assembly of claim 1, wherein the two outside straight edges of the two mounting holes of the mounting hole group have extension lines which are intersected.

4. The rotor lamination assembly of claim 3, wherein an angle between the two outside straight edges is from 145° to 180°.

5. The rotor lamination assembly of claim 1, wherein the protruding curve edges comprise circular arcs which take a projection point of the central axis as a center of a circle and the central hole comprises a curve edge which is concentric with the protruding curve edges.

6. A brushless motor comprising:
    a rotor rotatable about a longitudinal axis and comprising a plurality of magnets mounted within the rotor; and
    a stator sleeved about the rotor, the rotor and stator having gap formed between the stator and the rotor,
    wherein the rotor is formed by stacking a plurality of rotor laminations along the longitudinal axis forming a rotor lamination assembly and having a central hole with a central axis, the rotor being formed with an even number of mounting holes arranged between a rim of the central hole and an outer rim of the rotor lamination assembly, the outer rim of the rotor lamination assembly comprising the rotor further comprising:
        a projection on a plane substantially perpendicular to the central axis, the projection comprising:
            an even number of base curve edges;
            an even number of protruding curve edges; and
            connecting curve edges;

wherein each protruding curve edge is arranged between two adjacent base curve edges in a circumferential direction of the central axis, the protruding curve edges and the base curve edges are connected with each other through the connecting curve edges, every two mounting holes which are arranged symmetrically constitute a mounting hole group, a supporting portion is disposed between the two mounting holes and corresponded with the base curve edge in the circumferential direction of the central axis, and edges of the two mounting holes of the mounting hole group which are farthest from each other are respectively corresponded with the two adjacent protruding curve edges in the circumferential direction of the central axis, and wherein the base curve edges comprise circular arcs and the circular arcs have a center which is deviated from a projection point of the central axis, wherein the rim of the mounting hole on the plane substantially perpendicular to the central axis comprises an outside straight edge and an inside straight edge and wherein the outside straight edge and the inside straight edge are substantially parallel with each other, the outside straight edge is located on a side of the mounting hole which is close to the outer edge of the rotor lamination, and the inside straight edge is located on the other side of the mounting hole which is close to the central hole, wherein the projection of the rim of the mounting hole further comprises an inner magnetic isolated edge located on a side of the mounting hole which is close to the supporting portion and an outer magnetic isolated edge located on the other side of the mounting hole which is close to the protruding curve edge and wherein the inner magnetic isolated edge and the outer magnetic isolated edge are intersected with the outside straight edge, wherein the projection of the rim of the mounting hole further comprises an inner locating edge arranged on a side of the mounting hole which is close to the supporting portion and an outer locating edge arranged on the other side of the mounting hole which is close to the protruding curve edge and wherein the inner locating edge and the outer locating edge are substantially perpendicular to the inside straight edge, and wherein the inner locating edge is closer to the projection point of the central axis than the inner magnetic isolated edge.

\* \* \* \* \*